Oct. 16, 1956 G. W. ONKSEN ET AL 2,767,305
VEHICLE LAMP
Filed July 17, 1952 3 Sheets-Sheet 2
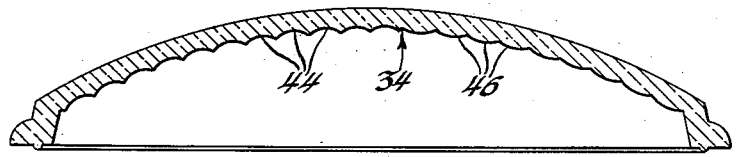
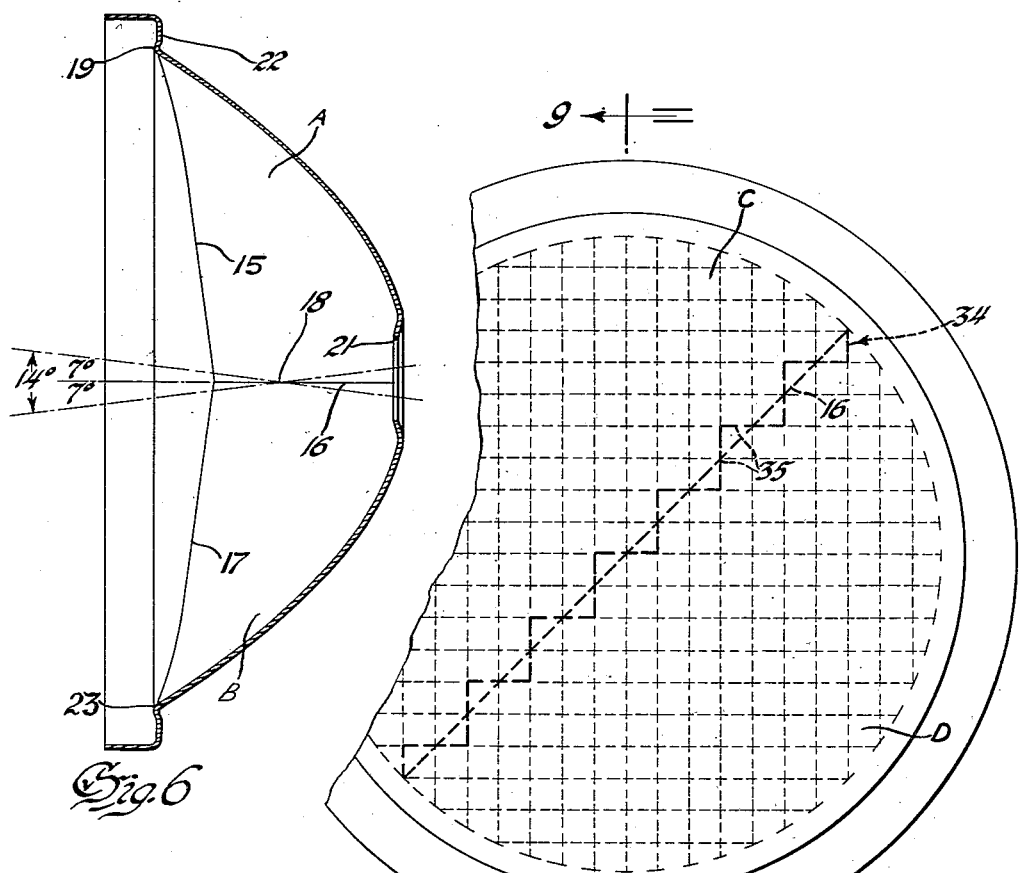
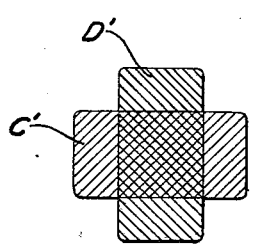
Inventors
George W. Onksen &
Carl A. Hokans
By
Willito, Helwig & Baillio
Attorneys

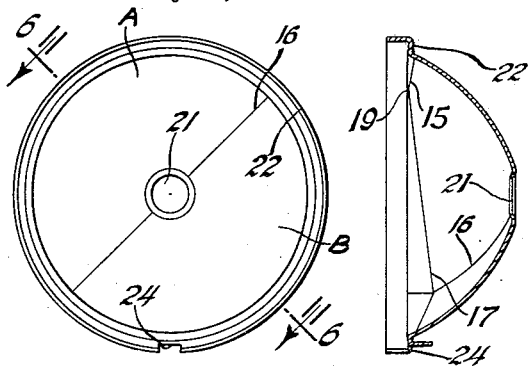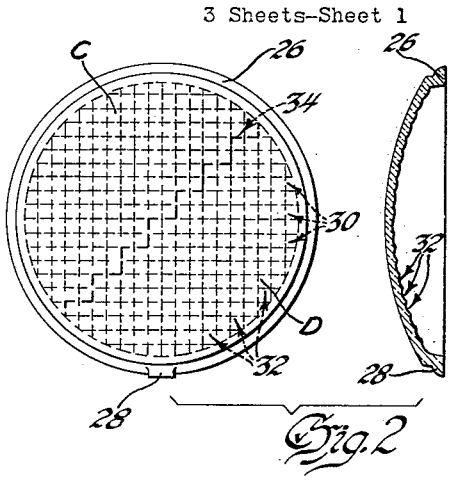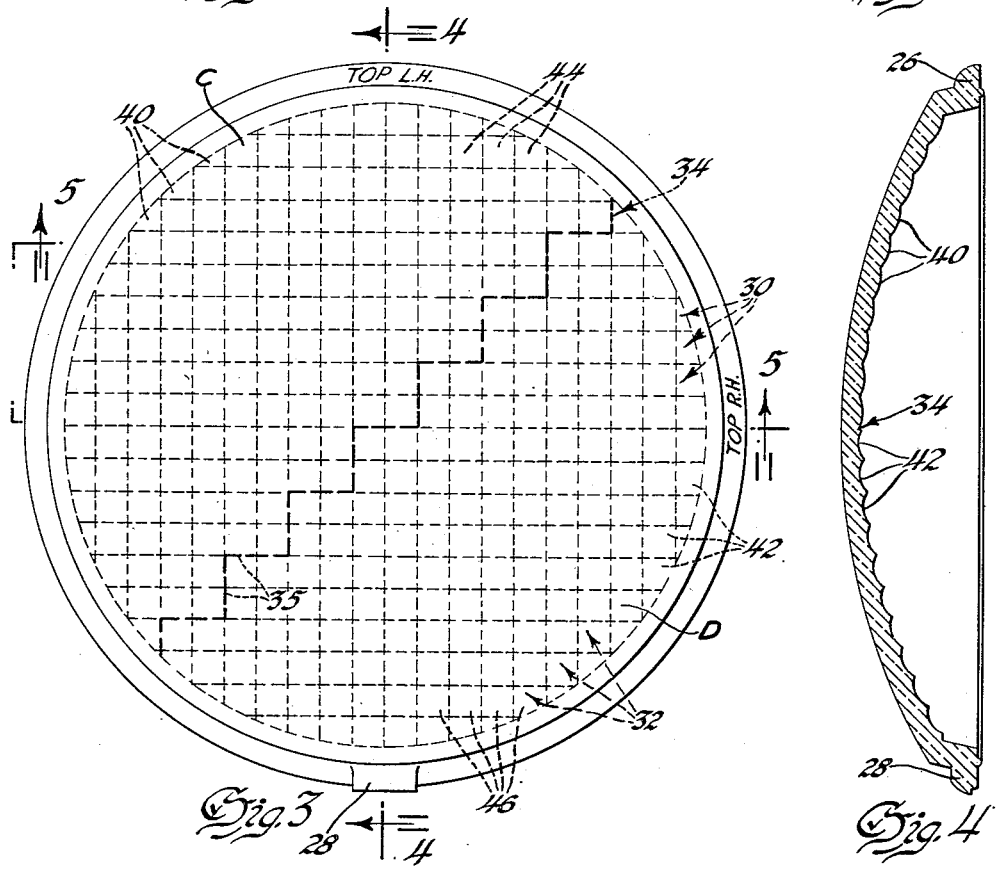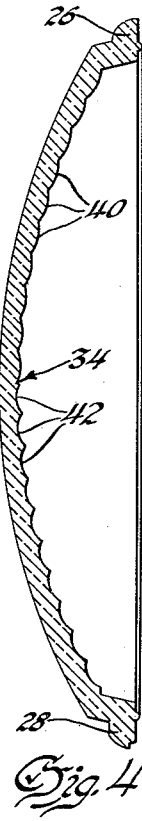

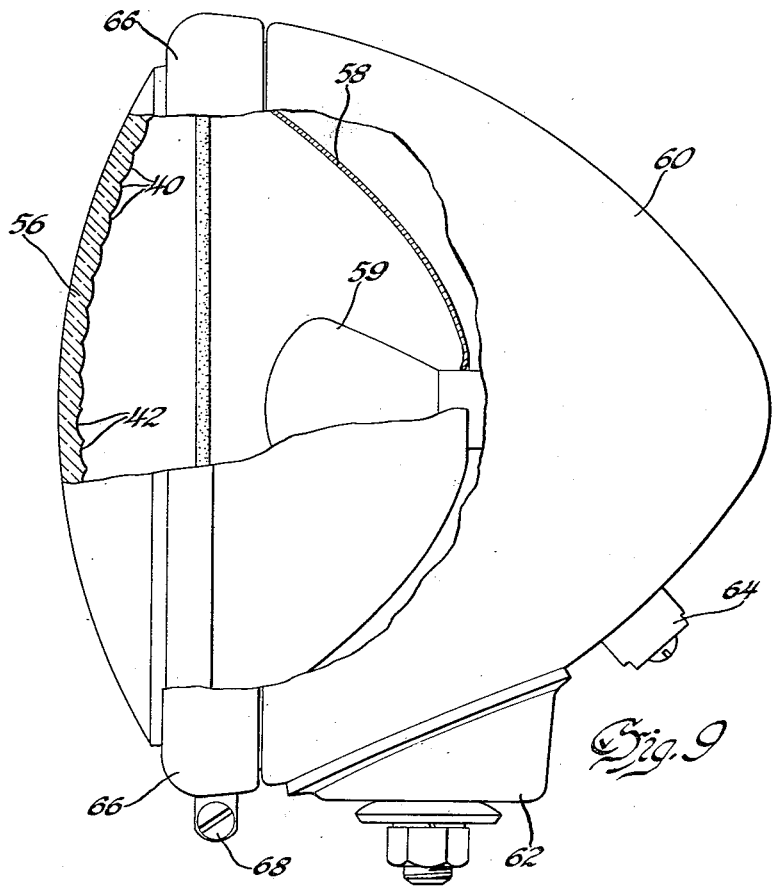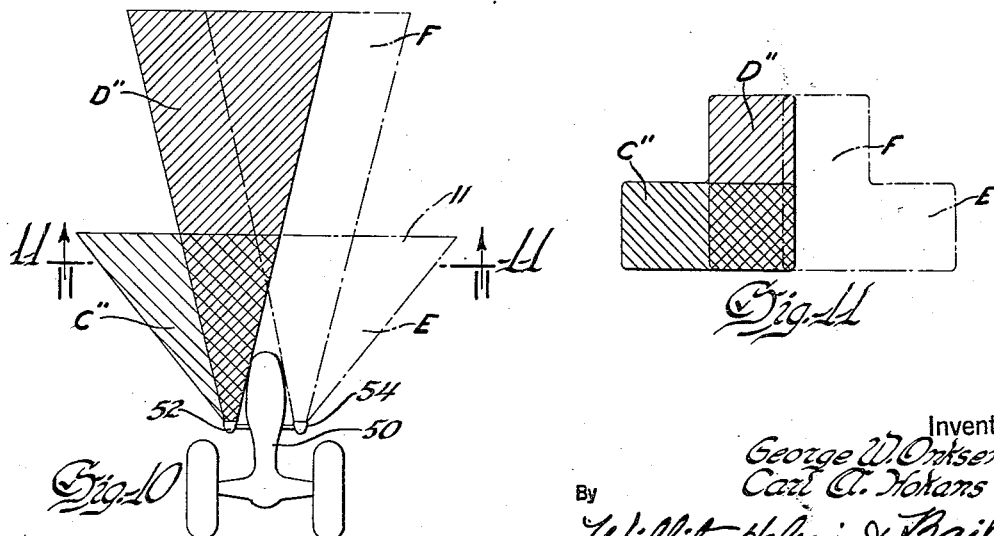

United States Patent Office 2,767,305
Patented Oct. 16, 1956

2,767,305

VEHICLE LAMP

George W. Onksen and Carl A. Hokans, Anderson, Ind., assignors to General Motors Corporation, Detroit, Mich., a corporation of Delaware Application July 17, 1952, Serial No. 299,418

7 Claims. (Cl. 240—41.3)

This invention relates to a vehicle lamp and more particularly to a vehicle lamp which projects a split light beam, one portion of the beam, for example, being projected directly to the front of the vehicle and another portion of the beam being projected laterally of the vehicle.

While the lamps of this invention may be used on all types of vehicles, they are particularly adapted for use as headlamps on tractors and other similar farm vehicles. As is well known, a great portion of farm work such as plowing, etc., is done at night and for this reason tractors are furnished with lighting equipment. This lighting equipment should be such as to furnish illumination not only to the front but also to the sides of the vehicle. Conventional headlamps have not been entirely satisfactory because compromises have had to be made between front and side illumination. If the beam were reduced in spread to provide adequate brightness to the front, the lateral illumination was poor; and if the beam spread were increased to provide adequate lateral illumination, the brightness to the front was too low.

It is an object of this invention to provide a vehicle lamp which will provide both frontal and lateral illumination. Another object of the invention is the provision of an improved headlamp which projects a split beam of light. Still another object of the invention is to provide a vehicle headlamp which projects an asymmetric light beam but which at the same time may interchangeably be used as either the left or right headlamp of the vehicle.

Briefly, the invention consists in the provision of a lamp having a novel lens element with a plurality of lens portions of different light bending properties, and a reflector having a plurality of portions of different light directing properties, said reflector having a predetermined orientation to the lens element so that the lens portions cooperate with the reflector portions to project a generally L-shaped light beam.

Other objects and advantages of the invention will appear more clearly from the following description of preferred embodiments and from the drawings in which:

Figure 1 shows a front view and a side view in section of the reflector;

Figure 2 shows a front view and a side view in section of the lens;

Figure 3 shows a front view of the lens drawn in larger scale than Figure 2;

Figure 4 is a view of the lens taken on the line 4—4 of Figure 3;

Figure 5 is a view of the lens taken on the line 5—5 of Figure 3;

Figure 6 is a view of the reflector taken on the line 6—6 of Figure 1 but in larger scale than Figure 1;

Figure 7 is a front view of a lamp embodying the invention;

Figure 8 is a diagram of the light pattern projected by the lens of this invention;

Figure 9 is a view taken on the line 9—9 of Figure 7;

Figure 10 is a diagrammatic view of a tractor provided with the lamps of this invention and illustrates the horizontal beam pattern, and Figure 11 is a view of the vertical beam pattern and is taken on the line 11—11 of Figure 10.

Referring now to the drawings, Figure 1 shows a reflector of the type used in the lamp of this invention and consists of two parabolic reflector sections A and B joined along the line indicated at 16, and tilted toward each other in such a manner that the focal point of each reflector section is at a common point. As can best be seen in Figure 6, the focal point 18 of the reflector sections A and B is adjacent the location which is normally occupied by the filament of a lamp bulb mounted in the reflector. Still referring to Figure 6, the angle between the axes of the reflector sections is, in the preferred embodiment, about 14°, each parabolic reflector section being tilted toward the longitudinal axis of the reflector at about 7°. The lines 15 and 17 in Figures 1 and 6 indicate the edges of the parabolic sections of the reflector which, because the reflector sections are tilted toward each other, are spaced from the circumferential edge of the reflector except at two points shown at 19 and 23 in Figure 6. It is to be understood, of course, that the tilt angle between the reflector halves A and B need not necessarily be 14° since other angles may be used according to the exact beam configuration desired. This will be more fully understood as the description of the invention continues.

In Figure 1 the reflector is shown properly oriented for the left front headlamp of the vehicle, the junction line 16 being at a 45° angle to the vertical and extending from lower left to upper right as seen from the front, or from lower right to upper left as seen from the rear. An opening 21 in the center of the reflector serves as a mounting position for a lamp bulb.

In the embodiment shown, the reflector is provided with an outwardly extending skirt 22 for mounting the lens. As shown in Figure 2, the lens is provided with pluralities of generally parallel elongated light bending elements 30 and 32 optically superimposed and angularly disposed to each other, and a peripheral flange 26 which fits into the reflector skirt 22. A locating lug 28, which cooperates with a slot 24 in the reflector skirt 22, affords means to properly orient the lens with respect to the reflector.

In the lens shown, the light bending elements consist of a plurality of horizontal flutes 30 and a plurality of vertical flutes 32 optically superimposed over the horizontal flutes. The variation in optical properties of the different flutes and flute portions as hereinafter described results in a plurality of lines 35, each joined to another to define a diagonal stepped line 34. The stepped line 34 divides the lens into two sections C and D having differing optical or light bending properties. When the lens is positioned on the reflector and properly oriented by means of the lug 28 as heretofore described, the line of direction established by the diagonal stepped line 34 will be generally parallel to and superimposed over the junction line 16 of the reflector. This feature can be seen more clearly by reference to Figure 7. It will be noted that the lines 16 and 34 divide the reflector and lens respectively into portions of equal size and shape. This feature, along with other structural features of the lens and reflector permits the use of the lamp for either the left or right headlamp.

Referring now to Figures 3, 4 and 5, the portions 40 of the horizontal flutes 30 above the line 34 are convex and have a radius of curvature such as will give the light about a 25° vertical spread, while those portions 42 of the flutes below the diagonal line are concave and have a radius of curvature so as to give about a 41° vertical spread. As can be seen in Figure 5, the portions 44 of the vertical flutes 32, which are to the left as shown of the diagonal line 34, are concave and have a radius of curvature such as will give the light a 41° horizontal spread, while those portions 46 of the vertical flutes 32 which are to the right of the diagonal line 34 are convex and have a radius of curvature which gives the light a 25° horizontal spread.

Thus, the section C of the lens, which is above and to the left (as shown) of the diagonal line 34, consists of superimposed concave horizontal and convex vertical flutes such as will spread the light through a 25° vertical and a 41° horizontal angle, while the section D, which is below and to the right of the diagonal line 34, consists of superimposed convex horizontal and concave vertical flutes such as will spread the light through a 41° vertical and a 25° horizontal angle.

If a conventional parabolic reflector were used so as to direct parallel light rays through the lens, a generally cross-shaped beam pattern (as projected on a vertical screen) would result. This is shown in Figure 8, the horizontal bar of light C' resulting from that portion C of the lens and the vertical bar of light D' resulting from that portion D of the lens.

It will be apparent from the above that the diagonal line 34 is the junction line of the 41° vertical-25° horizontal flutes with the 25° vertical-41° horizontal flutes. When the combination of convex and concave flutes described above is used, the diagonal line 34 is visible since it constitutes the junction of the convex with the concave flutes. However, when other fluting arrangements are used such for example as when all the flutes are concave or when all the flutes are convex, the line 34 may not be distinctly visible, especially when the difference between the curvatures of the groups of flutes is quite small.

Because each of the horizontal and vertical flutes 30 and 32 is divided into portions of different light-bending properties by a line section 35 which is perpendicular to the axis of the respective flutes, the resultant line 34 is stepped, each section 35 of the line 34 bridging the width of two flutes. This structure is advantageous because of the added simplicity of manufacturing technique it affords; however, a perfectly straight dividing line or one which consists of sections bridging the width of a single flute element could of course be used. The dividing line 34 in all cases establishes a line which extends in a single direction at about a 45° angle to the vertical.

While in the preferred embodiment we use a combination of convex and concave flutes as described above, this is of course not always essential. Alternatively, all portions of the vertical and horizontal flutes may be convex, all portions may be concave, or other combinations of convex and concave flutes may be used.

It is often advantageous to use flute curvatures other than those described; the combination best employed depends on the beam pattern characteristics desired. For example, a combination of 20° vertical-40° horizontal (that is, flutes which give a 20° vertical light spread and a 40° horizontal light spread) and 40° vertical-20° horizonal flutes may be used. We have found that the 25°-41° combination as described in conjunction with the preferred embodiment is excellent for use on farm vehicle headlamps.

In order to attain a smooth outer lens face, it is preferable to superimpose the vertical and horizontal flutes on the rear face of the lens. However, some or all of the flutes may of course be located on the front face of the lens.

The lens is positioned in the reflector as previously described, and a light bulb is mounted in the reflector in the conventional manner as shown in Figure 9. With the reflector and lens thus assembled the parabolic reflector section A cooperates with the lens section C and the parabolic reflector section B cooperates with the lens section D as described hereinafter.

The reflector section A directs parallel light rays slightly downwardly and to the left (looking from the rear of the reflector-lens assembly) through the lens section C, while the reflector section B directs parallel light rays slightly upwardly and to the right (looking from the rear) through the lens section D. Thus, the horizontal bar of light C', shown in Figure 8, will in this way be shifted down and to the left, while the vertical bar of light D' will be shifted up and to the right. The result is an L-shaped beam pattern, the "legs" of the L being of identical size and shape. From the above description it will be obvious that the angle of tilt between the reflector sections A and B will determine the amount the beam portions C' and D' are shifted and that the curvatures of the flutes on portions C and D of the lens will determine the size and shape of the beam portions C' and D'. While we prefer to use a tilt angle between the reflector sections of 14° and to use the 41°–25° flute structure described, it is to be understood that other modifications could be used, all within the spirit and scope of the invention. For example, the flute structure of the lens portions C and B may be of the type disclosed in U. S. patent application SN 147,724 whereby each of the beam portions will project a trapezoidal pattern on a vertical screen rather than the rectangular patterns shown in Figures 8 and 11.

Thus far the invention has been described in conjunction with the left front headlamp (looking from the rear of the vehicle). The reflector-lens assembly described can be used for the right front headlamp by merely rotating it through a 90° angle. This interchangeability results by way of the fact that the lens and reflector structures are such that the "legs" of the L-shaped beam pattern are identical in size and shape. It will be noted in Figure 3 that the lens is marked Top L. H. (left hand) and Top R. H. (right hand) to indicate the correct orientation for the lens-reflector assembly for the left or right headlamp. The beam pattern resulting from the two headlamps, left and right, is shown in Figures 10 and 11 wherein 50 represents a vehicle such as a tractor, 52 the left headlamp and 54 the right headlamp. On the ground the beam pattern from each lamp is fan-shaped; the portion C'' of the beam from the left lamp projects to the left side of the tractor 50 while the portion D'' projects to the front. The right lamp, which is identical in construction to the left lamp with the exception that the lens-reflector assembly is rotated 90° as previously described, projects a beam portion E to the right of the tractor 50 and a beam portion F to the front. It will be noted that the beam E on the right lamp would, if the lens-reflector were rotated 90° for use in the lamp 52 on the left side of the vehicle, be beam D''. The exact light pattern on the ground will, of course, depend on the height at which the lamps are mounted and the angle on which the lamps are tilted or depressed toward the ground.

The lamp housing for the reflector-lens assembly may be of any suitable type. A typical lamp embodying the invention is shown by Figures 7 and 9 in which 56 is the lens and 58 the reflector. A suitable bulb 59 is mounted in the reflector in the usual manner and the entire structure supported in a housing 60 provided with a suitable support 62. A bezel 66 secures the lens reflector assembly in the housing and is fastened by means of a screw member 68. Other types of lamp structure may of course be used. The invention can, for example, be embodied in a seal beam type lamp unit wherein the reflector is permanently and hermetically secured to the lens.

It is to be understood that, although the invention has been described with specific reference to particular embodiments thereof, it is not to be so limited. For example, all or some of the light bending elements shown herein as flutes on the lens may, if desired, be incorporated into the reflector structure rather than into the lens. Also, light bending elements other than flutes, such, for example, as prisms might be used. Similarly, other alterations or changes may be made which are within the full intended scope of this invention as defined by the appended claims.

We claim:

1. A lamp lens comprising a body having a plurality of generally parallel flutes extending across at least a portion of said lens, and a second plurality of generally parallel flutes optically superimposed over and at a right angle to said first mentioned flutes, each of said first mentioned and said second mentioned flutes being divided into two portions having different radii of curvature, those portions of said first mentioned flutes having a greater radius of curvature being of the same radius of curvature as those portions of said second mentioned flutes having a greater radius of curvature and being optically superimposed over those portions of said second mentioned flutes having a smaller radius of curvature, and those portions of said first mentioned flutes having a smaller radius of curvature being of the same radius of curvature as those portions of said second mentioned flutes having a smaller radius of curvature and being optically superimposed over those portions of said second mentioned flutes having a greater radius of curvature, the dividing points between said portions establishing a line transversing said lens in substantially a single direction and at about a 45° angle to each of said first mentioned and said second mentioned flutes, said line dividing said lens into two sections of substantially equal size and shape.

2. A lamp comprising in combination a reflector divided into two parabolic sections, the focal axes of said sections being tilted at an angle with respect to each other, said reflector sections being of equal size and shape and having a common focal point, a lens positioned in front of said reflector the plane of said lens being substantially perpendicular to the longitudinal axis of said reflector, and a light source between said reflector and said lens, said lens having a plurality of generally parallel flutes extending thereacross, a second plurality of generally extending flutes optically superimposed over and at a right angle to said first mentioned flutes, each of said first mentioned and said second mentioned flutes being divided into two portions having different radii of curvature, those portions of said first mentioned flutes having a greater radius of curvature being of the same radius of curvature as those portions of said second mentioned flutes having a greater radius of curvature and being optically superimposed over those portions of said second mentioned flutes having a smaller radius of curvature, and those portions of said first mentioned flutes having a smaller radius of curvature being of the same radius of curvature as those portions of said second mentioned flutes having a smaller radius of curvature and being optically superimposed over those portions of said second mentioned flutes having a greater radius of curvature, the dividing point between said portions establishing a line transversing said lens in substantially a single direction and at about a 45° angle to each of said first mentioned and said second mentioned flutes, said line being superimposed over the dividing line of said reflector and dividing said lens into two lens portions of substantially equal size and shape, each of said reflector sections being cooperative with one of said lens portions to project a beam of light characteristic of the light directing properties of said reflector section and the light bending properties of said lens portion.

3. A lamp comprising in combination a reflector divided into two parabolic sections, the focal axes of said sections being tilted at an angle of about 14° with respect to each other, said reflector sections being of equal size and shape and having a common focal point, a lens positioned in front of said reflector the plane of said lens being substantially perpendicular to the longitudinal axis of said reflector and a light source positioned at the focal point of said reflector sections, said lens being divided into two portions of equal size and shape by a line traversing said lens at about a 45° angle to the vertical, each of said lens portions having a plurality of generally parallel flutes with a radius of curvature to give a 41° light spread and a plurality of generally parallel flutes with a radius of curvature to give a 25° light spread optically superimposed over and at a right angle to said first mentioned flutes, said lens portions being adapted to project light patterns of equal size and shape and at a right angle to each other, each of said reflector sections being cooperative with one of said lens portions to project a generally L-shaped light beam.

4. A lamp lens comprising a body divided into two portions of substantially equal size and shape, one of said portions having a plurality of generally parallel vertically extending flutes with a radius of curvature to give about a 41° light spread and a plurality of generally parallel horizontally extending flutes with a radius of curvature to give about a 25° light spread optically superimposed over said first-mentioned flutes and the other of said portions having a plurality of generally parallel vertically extending flutes with a radius of curvature to give about a 25° light spread and a plurality of generally parallel horizontally extending flutes with a radius of curvature to give about a 41° light spread optically superimposed over said third-mentioned flutes, said lens portions being adapted to project elongated rectangular light patterns of substantially equal size and shape and having longitudinal axes at a right angle with respect to each other.

5. A lamp comprising in combination a reflector divided by a line into two parabolic sections, the focal axes of said sections being tilted at an angle with respect to each other, a lens positioned in front of said reflector, the plane of said lens being substantially perpendicular to the longitudinal axis of said reflector and the light source between said reflector and said lens, said lens comprising a body divided into two portions of substantially equal size and shape along a line generally coinciding with the dividing line of said reflector, each of said portions having a plurality of contiguous rectangular surfaces of compound curvature, the contiguous surfaces on one of said portions having the same curvature as the contiguous surfaces on the other of said portions but having axes of curvature oriented at a right angle to the respective axes of curvature of the contiguous surfaces on the other of said portions so that said portions are adapted to project elongated light patterns of equal size and shape with their longitudinal axes at a right angle to each other, each of said reflector sections being cooperative with one of said lens portions to project a beam of light characteristic of the light directing properties of the reflector section and the light bending properties of the lens portion.

6. A lamp lens comprising a round body divided along a diametric line into two portions of substantially equal size and shape, each of said portions having a plurality of contiguous rectangular surfaces of the same compound curvature and with a radius of curvature about one axis of curvature greater than the radius of curvature about the other aixs of curvature thereby being adapted to project an elongated light pattern on a vertical screen, the contiguous surfaces in one of said portions having the same curvature as the contiguous surfaces in the other of said portions but having axes of curvature oriented at an angle to the respective axes of curvature of the contiguous surfaces on the other of said portions so that said portions are adapted to project elongated light patterns of equal size and shape with their longitudinal axes at an angle to each other.

7. A lamp lens comprising a round body divided along a diametric line into two portions of substantially equal size and shape, each of said portions having a plurality of contiguous square surfaces curved about two axes at right angles to each other and with a greater radius of curvature about one of said axes than about the other of said axes, the contiguous surfaces in one of said portions having the same curvature as the contiguous surfaces in the other of said portions but having axes of curvature oriented at a right angle to the respective axes of curvature of the contiguous surfaces in the other of said portions so that said portions are adapted to project on a vertical screen elongated light patterns of equal size and shape with their longitudinal axes at a right angle to each other.

References Cited in the file of this patent

UNITED STATES PATENTS

| | | |
|---|---|---|
| 1,235,675 | Ford | Aug. 7, 1917 |
| 1,345,073 | Clark | June 29, 1920 |
| 1,686,593 | Wood | Oct. 9, 1928 |
| 1,955,599 | Lamblin-Parent | Apr. 17, 1934 |
| 1,991,866 | Rich | Feb. 19, 1935 |
| 2,137,079 | Falge | Nov. 15, 1938 |
| 2,253,615 | Falge et al. | Aug. 26, 1941 |
| 2,551,954 | Lehman | May 8, 1951 |
| 2,568,494 | Geissbuhler | Sept. 18, 1951 |

OTHER REFERENCES

"Guide Ray" (2 sheets), Sept. 26, 1925.